(12) United States Patent
Kumar et al.

(10) Patent No.: US 11,518,410 B2
(45) Date of Patent: Dec. 6, 2022

(54) METHOD AND SYSTEM FOR GENERATING VELOCITY PROFILES FOR AUTONOMOUS VEHICLES

(71) Applicant: Wipro Limited, Bangalore (IN)

(72) Inventors: Balaji Sunil Kumar, Karnataka (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 332 days.

(21) Appl. No.: 16/834,691

(22) Filed: Mar. 30, 2020

(65) Prior Publication Data

US 2021/0253130 A1 Aug. 19, 2021

(30) Foreign Application Priority Data

Feb. 17, 2020 (IN) .............................. 202041006822

(51) Int. Cl.
*G01S 17/931* (2020.01)
*B60W 40/06* (2012.01)
(Continued)

(52) U.S. Cl.
CPC ........ *B60W 60/0025* (2020.02); *B60W 40/06* (2013.01); *B60W 40/10* (2013.01);
(Continued)

(58) Field of Classification Search
CPC .. B60W 60/0025; B60W 40/06; B60W 40/10; B60W 50/045; B60W 2050/0005;
(Continued)

(56) References Cited

U.S. PATENT DOCUMENTS

2018/0170399 A1\* 6/2018 Osterman ............. B60W 10/04
2018/0330173 A1   11/2018 Zhu et al.
(Continued)

FOREIGN PATENT DOCUMENTS

KR 20220031938 A \* 11/2019

OTHER PUBLICATIONS

Silver, Nov. 25, 2019, English Machine Translation_KR20220031938A provided by Patent Translate by EPO and Google (Year: 2019).\*

*Primary Examiner* — Russell Frejd
*Assistant Examiner* — Ashley L Redhead, Jr.
(74) *Attorney, Agent, or Firm* — Finnegan, Henderson, Farabow, Garrett & Dunner, LLP

(57) ABSTRACT

Embodiments of the present disclosure relate to generating velocity profiles for an autonomous vehicle (101). An ECU (107) of the autonomous vehicle (101) receives road information from one or more sensors (106) associated with the autonomous vehicle (101). One or more parameters related to smooth movement of the autonomous vehicle on the road is determined from the road information. Further, a first velocity profile is produced using an AI model and a second velocity profile is produced using a hierarchical model, based on the one or more parameters. Furthermore, one of the first and the second velocity profile is selected by comparing the first and the second velocity profiles. The selected velocity profile has a lower value of velocity value compared to the other velocity profile. The selected velocity profile is provided to the autonomous vehicle (101) for navigating on the road (102) smoothly.

16 Claims, 11 Drawing Sheets

(51) Int. Cl.
  *B60W 40/10* (2012.01)
  *G06N 20/00* (2019.01)
  *B60W 60/00* (2020.01)
  *B60W 50/04* (2006.01)
  *G05B 13/02* (2006.01)
  *B60W 50/00* (2006.01)

(52) U.S. Cl.
  CPC ......... *B60W 50/045* (2013.01); *G01S 17/931* (2020.01); *G05B 13/0265* (2013.01); *G06N 20/00* (2019.01); *B60W 2050/0005* (2013.01); *B60W 2050/0014* (2013.01); *B60W 2552/05* (2020.02); *B60W 2552/53* (2020.02)

(58) Field of Classification Search
  CPC ..... B60W 2050/0014; B60W 2552/05; B60W 2552/53; B60W 60/001; B60W 2720/10; B60W 2720/103; B60W 30/143; B60W 2552/35; G01S 17/931; G01S 7/4802; G05B 13/0265; G06N 20/00; G06N 3/08; G06N 3/0454; G06N 20/10; G06N 3/0481
  See application file for complete search history.

(56) References Cited

U.S. PATENT DOCUMENTS

2019/0056748 A1     2/2019  Budihal et al.
2020/0353915 A1 * 11/2020  Rohde .................. G08G 1/0141

\* cited by examiner

| Best Parameter | Worst Parameter |
|---|---|
| $T_{r, best} = 0.9$ | $T_{r, worst} = 0.2$ |
| $H_{c, best} = 0.6 * H_h - 0.2 * \text{half } H_w$ | $H_{c, worst} = 0.6 * H_h - 0.2 * \text{half } H_w$ |
| $S_{c, best} > 0.2$ [for a specific lidar fitting = N/ 10, 000] | $S_{c, worst} > 0.05$ [for a specific lidar fitting = N/ 10, 000] |
| $C_{s, best} = 0$ | $C_{s, worst} = 45/360 = 0.125$ |

FIGURE 9

| Parameters | Maximum Speed ($S_{max}$) | Minimum Speed ($S_{min}$) |
|---|---|---|
| Fuel optimal vehicle speed | $S_{fo}$ | |
| Hump crossing speed | $S_{max-h}$ | $S_{min-h}$ |
| Rising slope speed | $S_{max-rs}$ | $S_{min-rs}$ |
| Declining slope speed | $S_{max-ds}$ | $S_{min-ds}$ |
| Rough terrain crossing | $S_{max-t}$ | $S_{min-t}$ |
| Steep turn crossing speed | $S_{max-st}$ | $S_{min-st}$ |

FIGURE 10

METHOD AND SYSTEM FOR GENERATING VELOCITY PROFILES FOR AUTONOMOUS VEHICLES

TECHNICAL FIELD

The present disclosure relates to automobile industry. Particularly, but not exclusively, the present disclosure relates to method and system for generating velocity profiles for autonomous vehicles.

BACKGROUND

An autonomous vehicle (driverless vehicle) uses various sensors to navigate through a path. Also, various techniques are used to detect obstacles in the surroundings of the vehicle. The autonomous vehicle has a central control unit that helps the vehicle to traverse a path to reach a destination location from a source location. Also, the central control unit detects any obstacles and manoeuvres the obstacles by traversing the vehicle in an alternate path. In few scenarios, when an obstacle is detected by the vehicle, a velocity of the vehicle needs to be reduced drastically. For example, when the autonomous vehicle is travelling on a highway, and there exists a speed breaker on the highway, the autonomous vehicle needs to reduce its velocity substantially and pass the speed breaker smoothly. Likewise, in many obstacles to smooth movement such as potholes, a bumpy road, a curve road and the like.

Existing autonomous vehicles monitor various road parameters to enable smooth driving on a road. Typically, the existing autonomous vehicles control velocity based on different scenarios that are stored and known. The autonomous vehicles are driven in test conditions simulating different scenarios. The road parameters during such test conditions are noted and the velocity for the autonomous vehicles are defined by experts. All possible conditions cannot be simulated and the defined velocity is not for a real-time condition on a road. Hence, the existing autonomous vehicles do not provide a smooth driving experience.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for generating velocity profiles for an autonomous vehicle. The method comprises receiving road information from one or more sensors associated with the autonomous vehicle, when the autonomous vehicle is moving on a road. Further, the method comprises determining one or more road parameters from the road information, related to smooth movement of the autonomous vehicle on the road. Furthermore, the method comprises producing a first velocity profile using an Artificial Intelligence (AI) model and second velocity profile using a hierarchical impact model, based on the one or more parameters. Each of the first velocity profile and the second velocity profile comprises at least a velocity value and a time duration for applying the velocity value. One of the first velocity profile and the second velocity profile is provided to the autonomous vehicle for navigating the road upon comparing the first velocity profile with the second velocity profile.

In an embodiment, the present disclosure relates to an Electronic Control Unit (ECU) for generating velocity profiles for an autonomous vehicle. The ECU is configured to receive road information from one or more sensors associated with the autonomous vehicle, when the autonomous vehicle is moving on a road. Further, the ECU determines one or more road parameters from the road information, related to smooth movement of the autonomous vehicle on the road. Furthermore, the ECU produces a first velocity profile using an Artificial Intelligence (AI) model and second velocity profile using a hierarchical impact model, based on the one or more parameters. Each of the first velocity profile and the second velocity profile comprises at least a velocity value and a time duration for applying the velocity value. One of the first velocity profile and the second velocity profile is provided to the autonomous vehicle for navigating the road upon comparing the first velocity profile with the second velocity profile.

In an embodiment, the present disclosure relates to a non-transitory computer readable medium including instructions stored thereon that when processed by at least one processor cause a device to perform operations comprising receiving road information from one or more sensors associated with the autonomous vehicle, when the autonomous vehicle is moving on a road. Further, the medium causes the processor to determine one or more road parameters from the road information, related to smooth movement of the autonomous vehicle on the road. Furthermore, the medium causes the processor to produce a first velocity profile using an Artificial Intelligence (AI) model and second velocity profile using a hierarchical impact model, based on the one or more parameters. Each of the first velocity profile and the second velocity profile comprises at least a velocity value and a time duration for applying the velocity value. One of the first velocity profile and the second velocity profile is provided to the autonomous vehicle for navigating the road upon comparing the first velocity profile with the second velocity profile.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 4A:
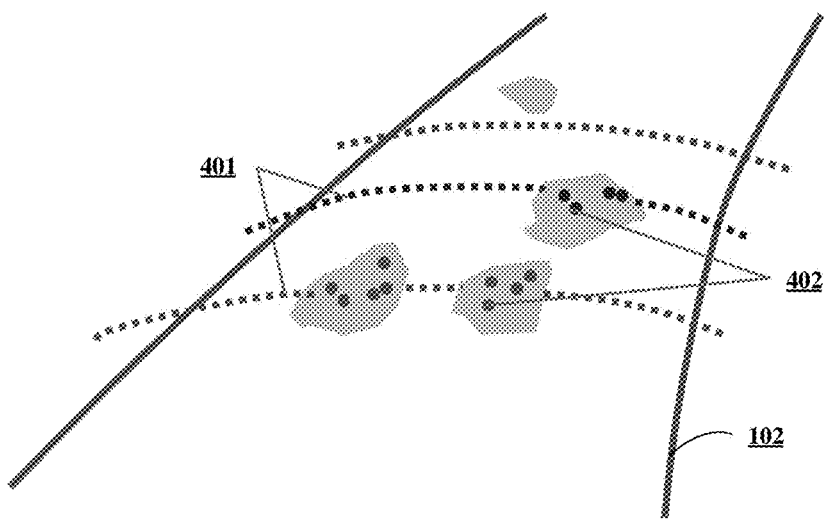
Figure 4B:
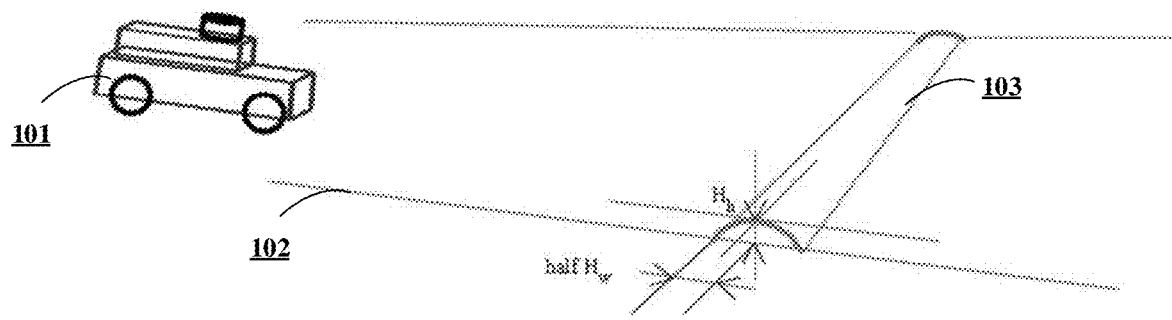
Figure 4C:
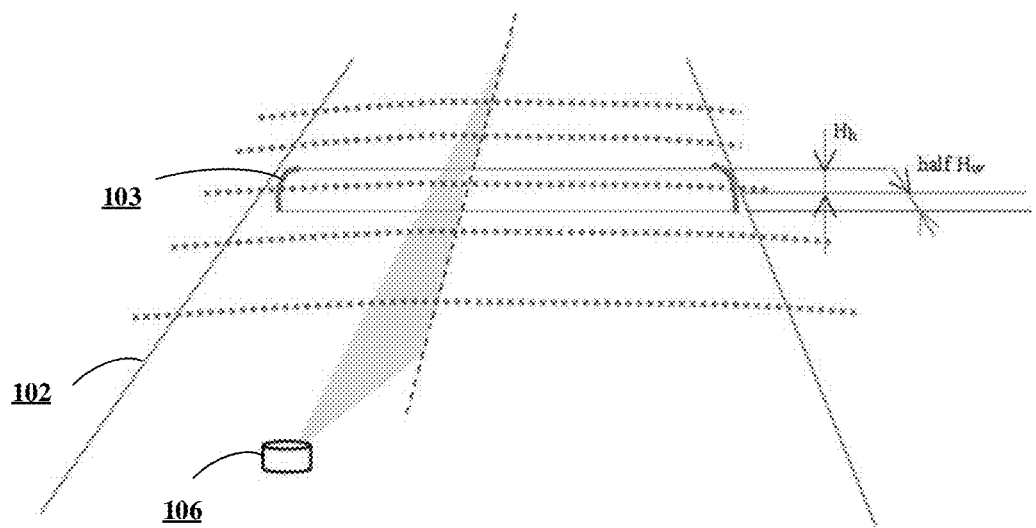
Figure 6:
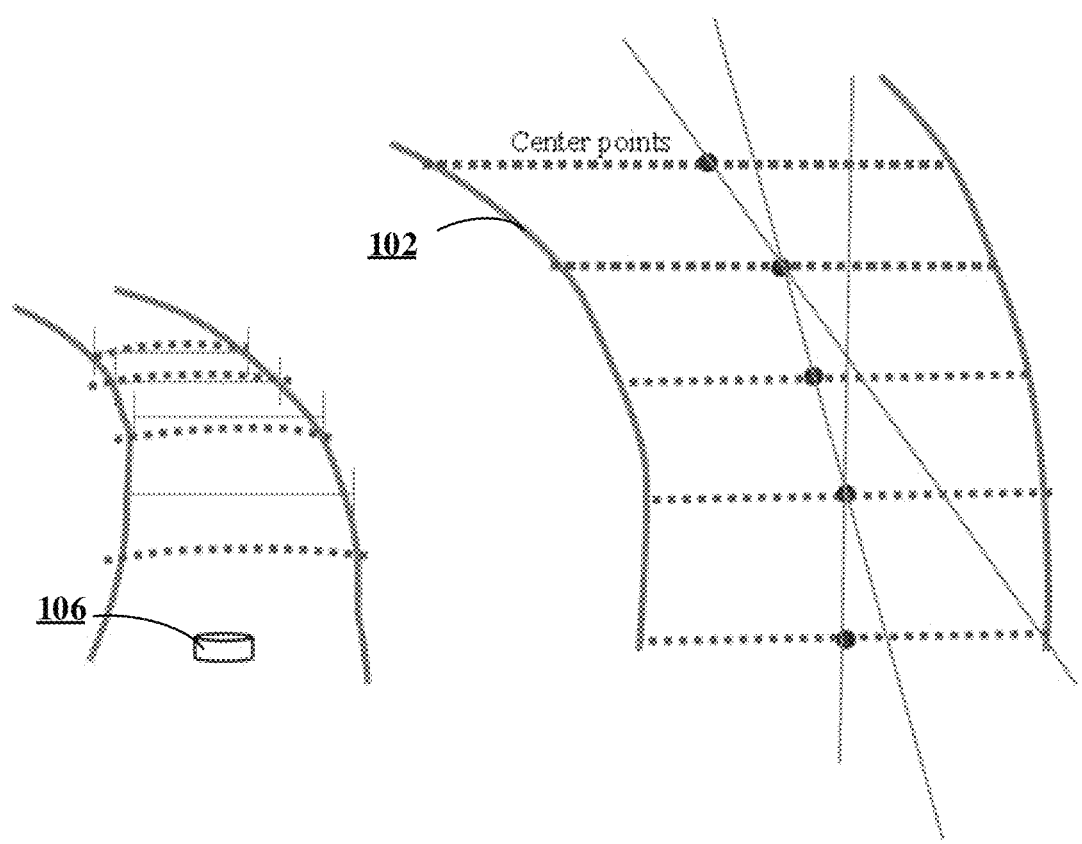
Figure 7:
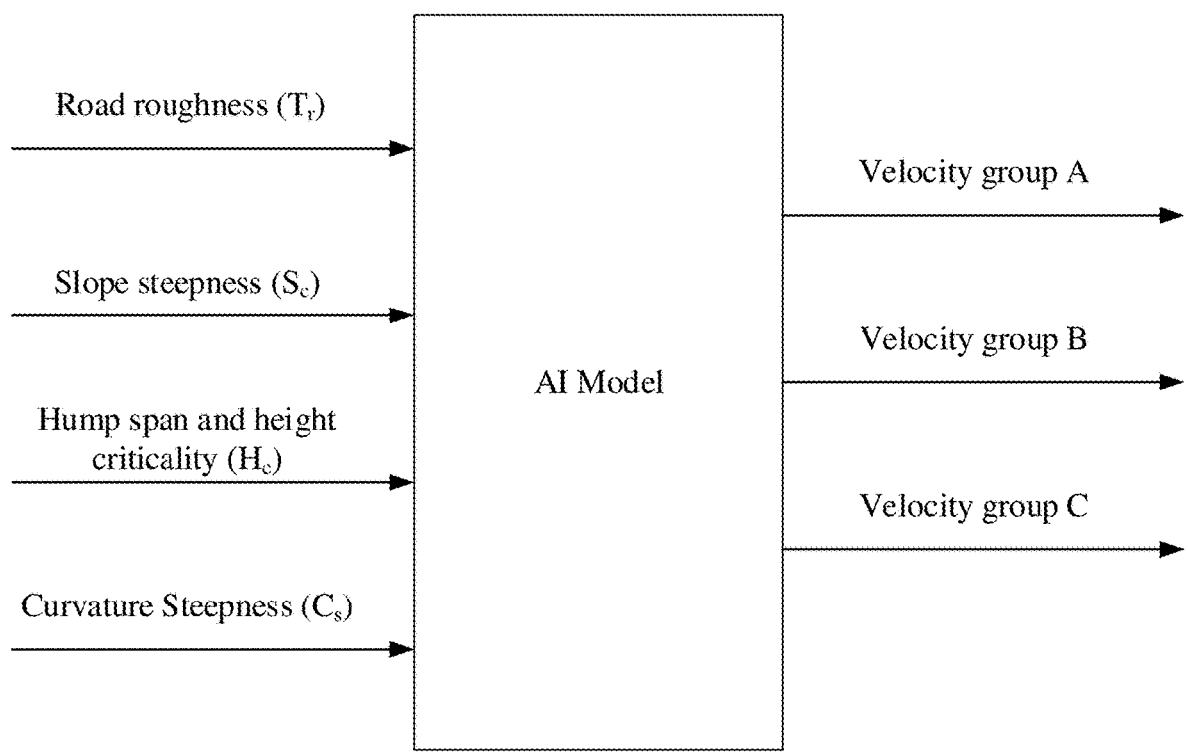
Figure 8A:
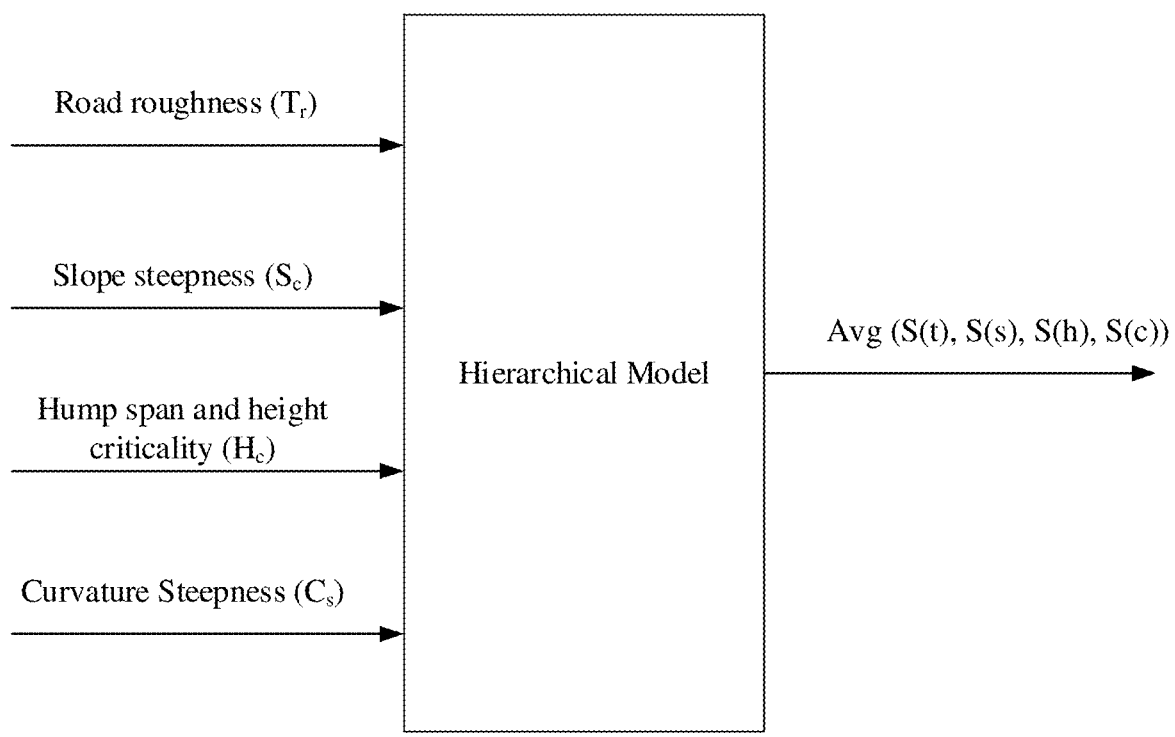
Figure 8B:
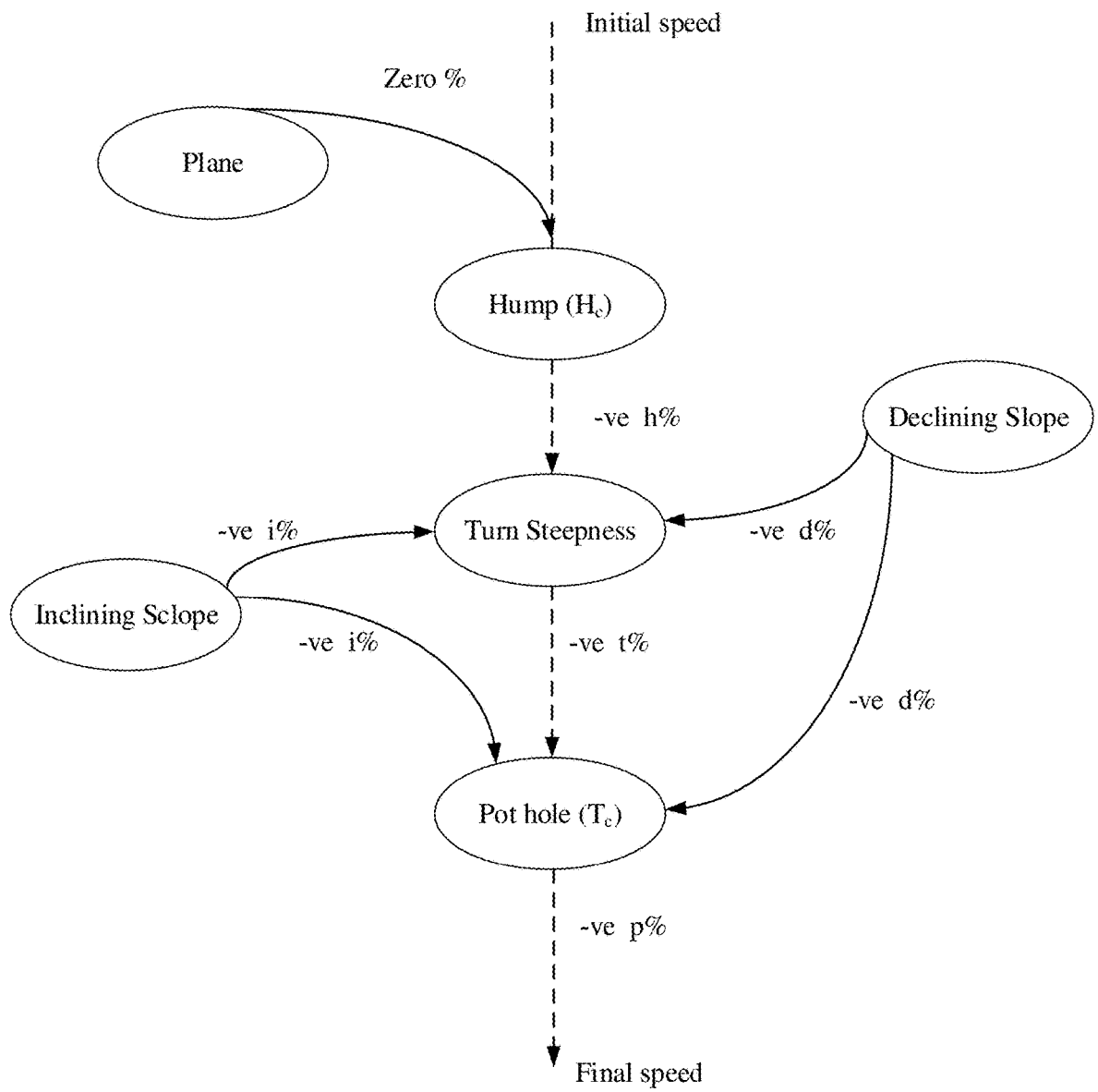

FIG. 4A, FIG. 4B and Figure, FIG. 4C illustrate determining road parameters in view of obstacles on a road, in accordance with some embodiments of the present disclosure;

FIG. 5A, FIG. 5B, FIG. 5C and FIG. 5D illustrate determining road parameters in view of gradient of road, in accordance with some embodiments of the present disclosure;

FIG. 6 illustrates determining road parameters in view of a curve road, in accordance with some embodiments of the present disclosure;

FIG. 7 is illustrative of an AI model for generating a first velocity profile, in accordance with some embodiments of the present disclosure;

FIG. 8A is illustrative of a hierarchical model for generating a second velocity profile, in accordance with some embodiments of the present disclosure;

FIG. 8B is an exemplary illustration of the impact of one or more road parameters on the autonomous vehicle, in accordance with some embodiments of the present disclosure;

FIG. 9 shows a table illustrating best and worst values for each road parameter, in accordance with some embodiments of the present disclosure; and FIG. 10 shows a table illustrating maximum and minimum values of speed to navigate the road in different scenarios, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to generating velocity profiles for an autonomous vehicle. The generated velocity profiles provides smooth driving experience in different road conditions. The ECU of the autonomous vehicle receives road information from one or more sensors associated with the autonomous vehicle. One or more parameters related to smooth movement of the autonomous vehicle on the road is determined from the road information. Further, a first velocity profile is produced using an Artificial Intelligence (AI) model and a second velocity profile is produced using a hierarchical model, based on the one or more parameters. Furthermore, one of the first and the second velocity profile is selected by comparing the first and the second velocity profiles. The selected velocity profile has a lower value of velocity value compared to the other velocity profile. The selected velocity profile is provided to the autonomous vehicle for navigating on the road smoothly.

Figure 1:
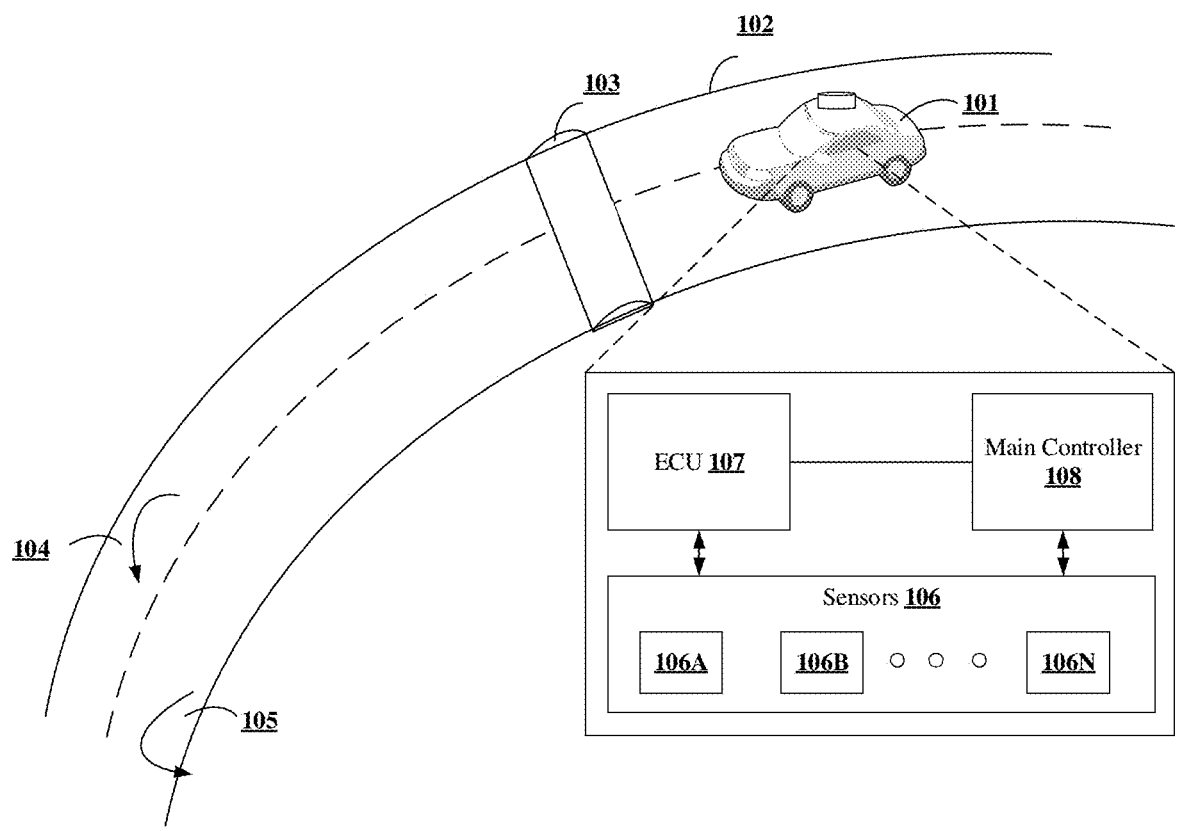
FIG. 1 is illustrative of an environment for generating velocity profiles for an autonomous vehicle, in accordance with some embodiments of the present disclosure.

FIG. 1 shows an environment of producing/generating velocity profiles for an autonomous vehicle (101). The environment includes the autonomous vehicle (101), a road (102), a hump/speed breaker (103), a gradient (104) and a curvature (105). The autonomous vehicle (101) includes one or more sensors (106A, 106B, . . . , 106N), an Electronic Control Unit (ECU) (107) and a main controller (108). In an embodiment, the hump (103), the gradient (104) and the curvature (105) may cause the autonomous vehicle (101) to reduce the velocity. A person skilled in the art will appreciate that other parameters which are not mentioned in the present disclosure are also within the scope and the present disclosure is not limited to above mentioned parameters alone. Consider an example where the autonomous vehicle (101) is moving at 45 km/hr on a smooth road (102). In presence of the hump (103), the autonomous vehicle (101) may have to reduce the velocity drastically, may be to 10 km/hr to cross the hump (103) smoothly. Likewise, in presence of the curvature (105) or the gradient (104), the autonomous vehicle (101) may have to reduce the velocity drastically to avoid discomfort to passengers inside the autonomous vehicle (101).

In an embodiment, the one or more sensors (106) may include, but not limited to, a Light Detection and Ranging (LIDAR), an imaging sensor, a proximity sensor, and a weather sensor. The one or more sensors (106) may be installed on the autonomous vehicle (101) to measure road information. In an embodiment, the main controller (108) may be used for autonomously navigating the autonomous vehicle (101) in a forward path. The main controller (108) may be connected to the one or more sensors (106) and may receive the road information from the one or more sensors (106). In an embodiment, the ECU (107) may be a part of the main controller (108) or may be a standalone unit and associated with the main controller (108). When the ECU (107) is part of the main controller (108), the ECU (107) may receive the road information from the one or more sensors (106). When the ECU (107) is a standalone unit, the ECU (107) may receive the road information from the main controller (108) which would have received from the one or more sensors (106). In an embodiment, the ECU (107) may be configured to determine one or more parameters from the road information. The one or more parameters may be related to smooth movement of the autonomous vehicle (101) on the road (102). In the present disclosure, one or more parameters and one or more road parameters are used interchangeably. In an embodiment, the one or more parameters may include, but not limited to, the hump (103), the gradient (104), the curvature, a pothole, a road boundary, an obstacle, a traffic sign, a road sign, and a median. Further, the ECU (107) may be configured to produce/generate a plurality of velocity profiles based on the one or more parameters. The ECU (107) may select a most relevant velocity profile from the plurality of velocity profiles and provide to the main controller (108) to navigate the autonomous vehicle (101) according to the velocity profile. The selected velocity profile ensures smooth navigation on the road (102). The main controller (108) may be connected to vehicle propulsion systems (not shown in FIG. 1) to apply the velocity profile to the autonomous vehicle (101).

Figure 2:
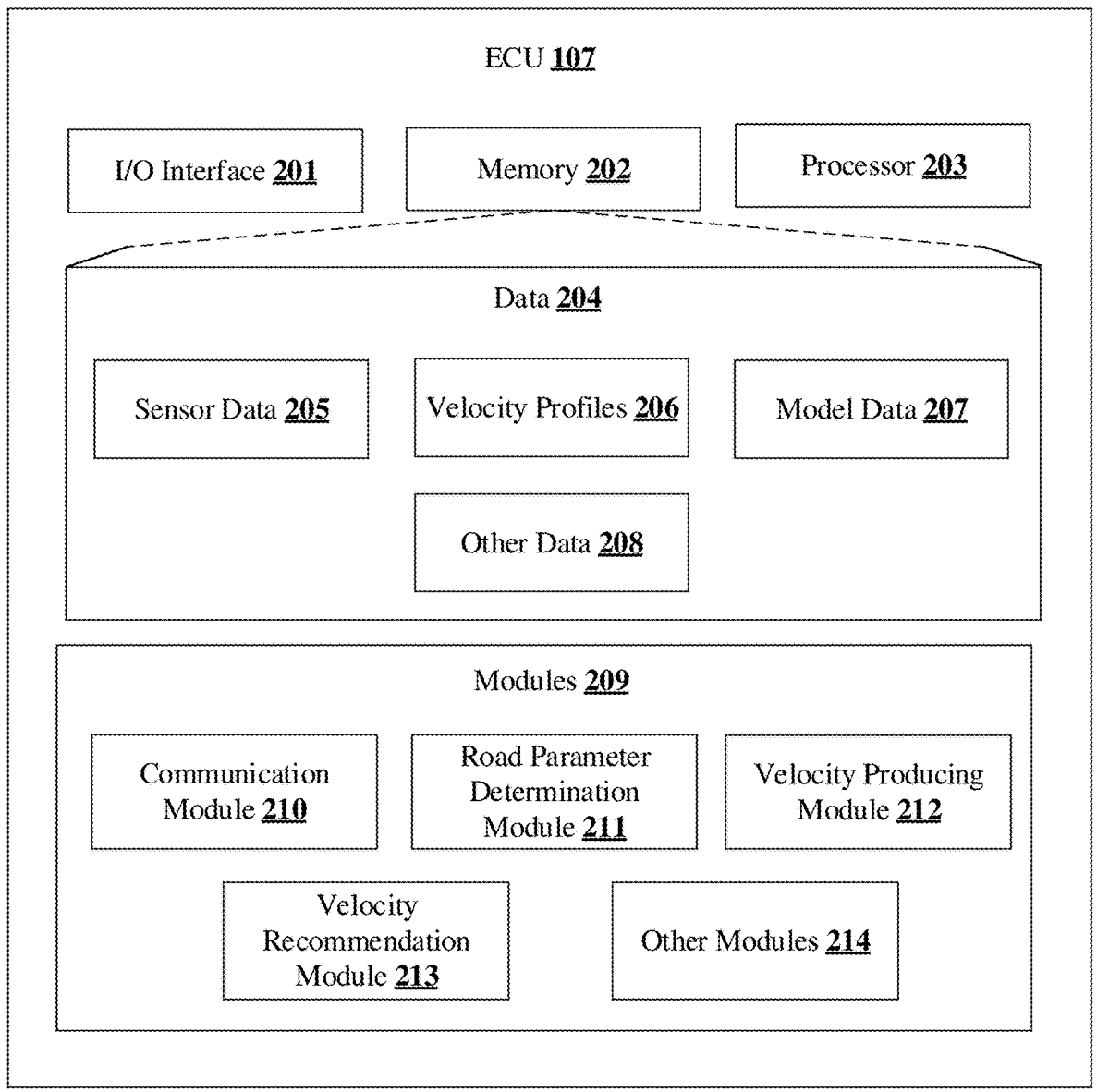
FIG. 2 is a block diagram of internal architecture of an ECU configured to generate velocity profiles for an autonomous vehicle, in accordance with some embodiments of the present disclosure.

FIG. 2 illustrates internal architecture of the ECU (107) in accordance with some embodiments of the present disclosure. The ECU (107) may include at least one Central Processing Unit ("CPU" or "processor") (203) and a memory (202) storing instructions executable by the at least one processor (203). The processor (203) may include at least one data processor for executing program components for executing user or system-generated requests. The memory (202) is communicatively coupled to the processor (203). The ECU (107) further includes an Input/Output (I/O) interface (201). The I/O interface (201) is coupled with the processor (203) through which an input signal or/and an output signal is communicated.

In an embodiment, data (204) may be stored within the memory (202). The data (204) may include, for example, sensor data (205), velocity profiles (206), model data (207), and other data (208).

In an embodiment, the sensor data (205) may include road information. The one or more sensors (106) detect any obstacles and monitors road parameters in the forward path. The obstacles and the road parameters are provided as road information to the main controller (108) or the ECU (107). For example, the one or more sensors 103 may detect the hump (103) or the road curvature (105) to be steep.

In an embodiment, velocity profiles include at least a velocity value and a time duration for applying the velocity value. For example, a first velocity profile may include a velocity value of 14 k/hr to be applied for a duration of 2 seconds, a second velocity profile may include a velocity value of 10 km/hr to be applied for 4 seconds.

In an embodiment, the model data (207) may include parameters of an Artificial Intelligence (AI) model. The parameters of the AI model may include but not limited to training data set, bias values, weight values, and activation functions. The training data set may be used to train the AI model during a training stage to produce a first velocity profile. The training data set may include road parameters and velocity values for different combination of road parameters. In an embodiment, the velocity values may be determined by an expert during the training stage. In an embodiment, the training data set may be generated using simulation or by navigating the autonomous vehicle (101) on test paths. In an embodiment, the weight values may indicate a strength of association between one or more input nodes and one or more output nodes. In an embodiment, the bias values may indicate how the AI model fits with the training data set. For example, high bias may indicate that the AI model is not fitting the training data set and a low bias may indicate that the AI model is fitting the training data set. In an embodiment, activation functions are used to activate specific neuron in each layer of the AI model.

In an embodiment, the other data (208) may include but is not limited to traffic information, navigation details, environment parameters and the like. For example, the traffic information may include number of vehicles on the road (102), the navigation details may include a source location and a destination location and the environment parameters may include a temperature around the autonomous vehicle (101).

In an embodiment, the data (204) in the memory (202) is processed by modules (209) of the ECU 1(107). As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules (209) when configured with the functionality defined in the present disclosure will result in a novel hardware.

In one implementation, the modules (209) may include, for example, a communication module (210), a road parameter determination module (211), a velocity producing module (212), a velocity recommendation module (213), and other modules (214). It will be appreciated that such aforementioned modules (209) may be represented as a single module or a combination of different modules.

The communication module (210) may be configured to enable communication between the ECU (107) and other units (not shown in figures) of the autonomous vehicle (101). In an embodiment, the other units may comprise, but are not limited to, a transmission control unit, door unit, a steering controller, an indication unit, etc. For example, the communication module (210) may receive sensor data (205) from the one or more sensors (106). Also, the communication module (210) may convey instructions to the main controller (108). Also, the communication module (210) may communicate instructions to the one or more sensors (106) regarding activation and deactivation of the one or more sensors (106).

In an embodiment, the road parameter determination module (211) may be configured to determine one or more parameters from the road information. The road parameter determination module (211) may receive the road information from the communication module (210) and determine the one or more parameters that relate to smooth movement of the autonomous vehicle (101) on the road (102). In an embodiment, the one or more parameters may be defined and the road parameter determination module (211) may identify the defined one or more parameters from the road information. In another embodiment, the one or more parameters may be identified by the road parameter determination module (211) based on an impact of the one or more parameters on the smooth movement on the autonomous vehicle (101). In an embodiment, a parameter which may not be defined may be considered as a potential parameter which affects the smooth movement of the autonomous vehicle (101). For example, an autonomous vehicle (101) which is normally driven in tropical climate, snow may not be considered as a parameter affecting the smooth movement. However, when the autonomous vehicle (101) is driven in a snow climate, the road parameter determination module (211) may consider snow as potential parameter affecting the smooth movement. Such determination may be made by receiving information from a central server (not shown in FIG. 1) which may store data related to a plurality of velocity profiles of a plurality of autonomous vehicles. In an embodiment, the road parameter determination module (211) may also assign a criticality factor to each of the one or more parameters. The criticality factor of a parameter may indicate how critical it is for the autonomous vehicle (101) to navigate the road (102) in view of the parameter.

In an embodiment, velocity producing module (212) may be configured to produce or generate a plurality of velocity profiles for the autonomous vehicle (101). The velocity producing module (212) may receive the one or more parameters from the road parameter determination module (211) and produce at least a first velocity profile using the AI model and a second velocity profile using a hierarchical model, based on the one or more parameters. In an embodiment, the AI model may be trained to produce the first velocity profile based on the training data set. In an embodiment, the hierarchical model may be configured to generate the second velocity profile based on one or more rules. In an embodiment, the first velocity profile and the second velocity profile may be produced simultaneously. The first velocity profile and the second velocity profile may include respective velocity value and the time duration for applying the velocity value.

In an embodiment, velocity recommendation module (213) may be configured to recommend or select one of the first velocity profile and the second velocity profile and provide the selected velocity profile to the autonomous vehicle (101) to smoothly navigate the road (102). The velocity recommendation module (213) may compare the first velocity profile and the second velocity profile. In an embodiment, the velocity recommendation module (213) may select the velocity profile having the velocity value lesser than the other velocity profile. For example, the first velocity profile may include a velocity value of 14 km/hr and the second velocity profile may include a velocity value of 10 km/hr. The velocity recommendation module (213) may select the second velocity profile to apply on the autonomous vehicle (101) in view of safety of the autonomous vehicle (101). In an embodiment, the velocity recommendation module (213) may select the first velocity profile when a difference between the velocity values of the first and the second velocity profiles are within a threshold value. For example, considering that the threshold value is 5 km/hr, the velocity recommendation module (213) may select the first velocity profile having the velocity value of 14 km/hr over the second velocity profile having the velocity value of 10 km/hr, as the difference between 14 km/hr and 10 km/hr is less than the threshold value of 5 km/hr.

In an embodiment, the other modules (214) may include, but is not limited to, an indication module to indicate when the vehicle is needs to reduce the velocity drastically, a navigation module configured to initiate navigation process to autonomously drive from the source location to the destination location, a path planning module to produce base path for the autonomous vehicle (101) to navigate from the source location to the destination location, a trajectory and velocity application module configured to generate and apply the velocity to the autonomous vehicle (101) according to the selected velocity profile.

Figure 3:
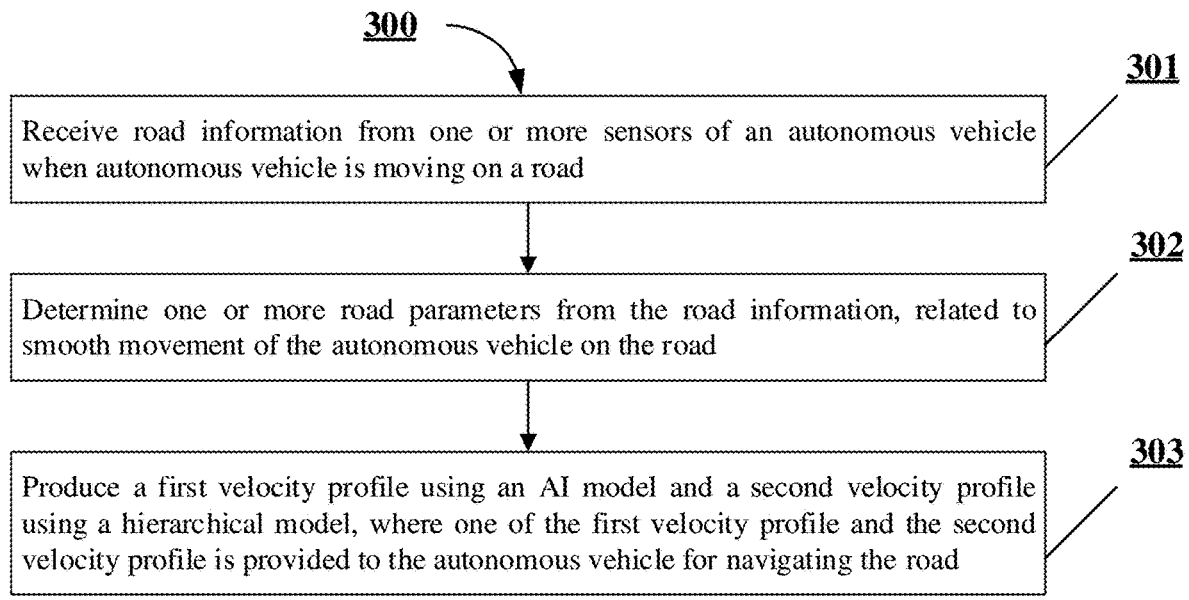
FIG. 3 is illustrative of exemplary method steps for generating velocity profiles for an autonomous vehicle, in accordance with some embodiments of the present disclosure.

FIG. 3 shows a flow chart illustrating a method for generating velocity profiles for the autonomous vehicle (101), in accordance with some embodiments of the present disclosure.

As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step (301), receive road information from the one or more sensors (106) when the autonomous vehicle (101) is moving on the road (102). The communication module (210) may receive the road information from the one or more sensors (106) at regular intervals (e.g., every 5 mili seconds). The received road information may be pre-processed, for example, removing noise, normalize values, convert format and the like.

At step (302), determine one or more road parameters from the road information, related to smooth movement of the autonomous vehicle (101) on the road (102). The road parameter determination module (211) may receive the road information from the communication module (210) and determine the one or more road parameters that affect the smooth movement of the autonomous vehicle (101) on the road (102). For example, the one or more road parameters may include, potholes on the road (102), the hump (103), the gradient (104) of the road (102) and the curvature (105) of the road (102).

Reference is now made to FIG. 4A which illustrates determining roughness of the road (102). In an exemplary embodiment, the LDIAR may be used in autonomous vehicle (101) to detect obstacles and measure road parameters. FIG. 4A may be a LIDAR map of the road (102). As seen in FIG. 4A, (401) may represent the LDIAR points on a plane same as a LIDAR plane, and (402) may represent the LIDAR points on a different plant from the LIDAR plane. The LIDAR plane may be a plane of measurement by the LIDAR. In FIG. 4A, the points (402) may be potholes. In addition to LIDAR, the imaging unit may be used to capture the potholes. The measurements from the LIDAR and the imaging unit may be used to determine the parameters related to the potholes (e.g., width of the pothole, depth of the pothole). Further, the road parameter determination module (211) may determine that the parameters of the potholes may affect the smooth movement of the autonomous vehicle (101).

Referring to FIG. 4B and FIG. 4C, an illustration of detecting the hump (103) on the road (102) is provided. As illustrated in FIG. 4B and FIG. 4C, the LIDAR and/or the imaging unit may view the hump (103) partially on the road (102). FIG. 4B shows a side view of the hump (103) on the road (102) and the FIG. 4C shows a front view of the hump (103) on the road (102). Using the LIDAR and the imaging unit, the autonomous vehicle (101) may determine half of the width (half $H_w$) of the hump (103) and a height ($H_h$) of the hump (103). If the height, width and length of the hump (103) are represented by z, x and y respectively, x and y values fall on a straight line, as z value remains same for all LIDAR projections (as height remains same for all length and width values when LIDAR rays are projected from the front as shown in FIG. 4C). An alignment (M) of the points x, y and z may be represented as:

$$M=(y2-y1)/(x2-x1) \qquad (1)$$

Now with same line alignment (M), other LIDAR point reflection may be found from a surface of the road (102) (i.e., z=0) which are just at the base of the hump (103), i.e. (x3, y3, 0), (x4, y4, 0) where a small increment or decrement ($\Delta$) in either of x3 and y3 or x4 and y4 may indicate a non-zero 'z' value. A distance between the two lines ((x3, y3, 0) and (x4, y4, 0) may indicate a half span of hump (103) 'half $H_w$'. A hump criticality may be defined as:

$$H_c = \text{func}(H_h, \text{half } H_w) = 0.6 * H_h - 0.2 * \text{half } H_w \qquad (2)$$

where 0.6 & 0.2 are the experimental constant and may vary for different trails.

Figure 5A:
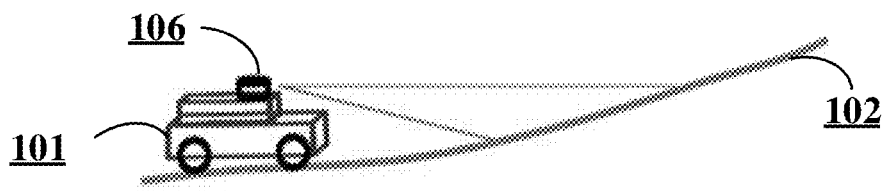
Figure 5B:
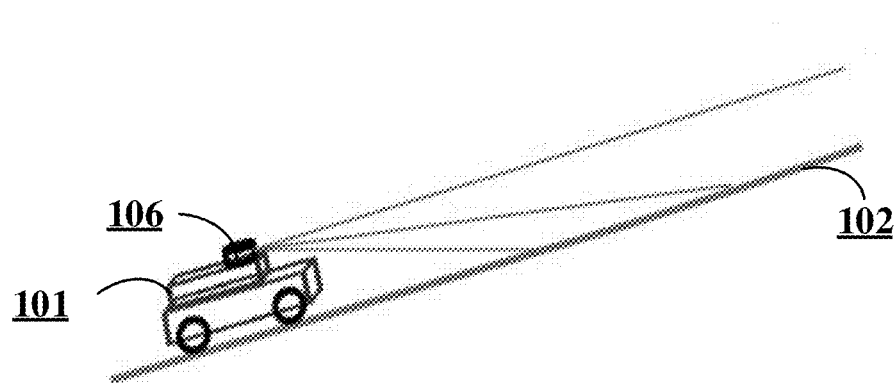
Figure 5C:
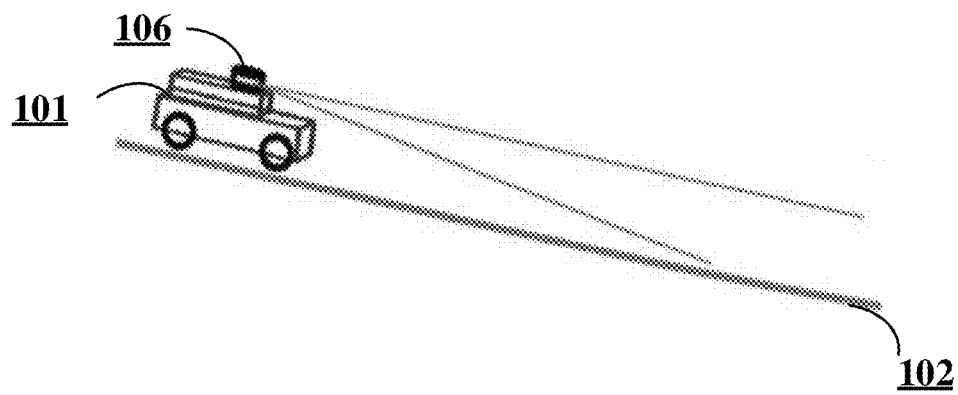
Figure 5D:
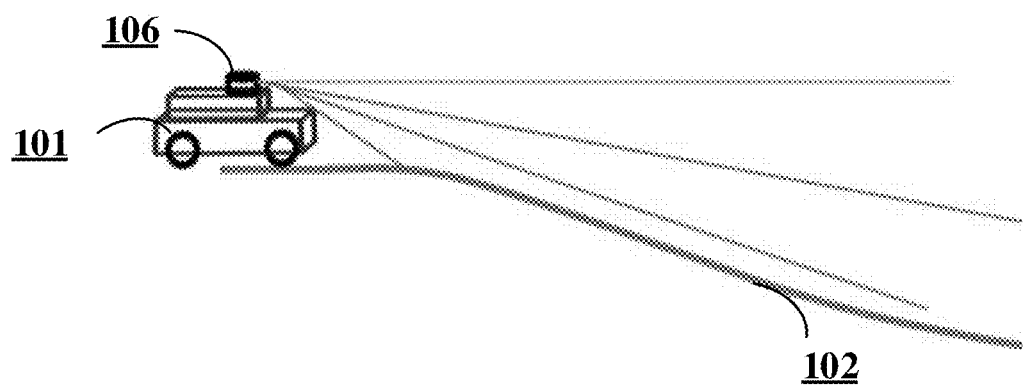

Reference is now made to FIG. 5A-FIG. 5D. FIG. 5A to 5D illustrate determining the gradient (104) of the road (102). FIG. 5A and FIG. 5B illustrate determining an upward gradient (104). As shown in FIG. 5A and FIG. 5B, the LIDAR projections are transmitted. The LIDAR projections in the axis of the autonomous vehicle (101) may be considered as central projections. From the FIG. 5A, the for the upward gradient (104), one or more LIDAR projections below the central projection may reflect from the surface of the road (102). As the autonomous vehicle (101) moves toward the upward gradient (104), number of LIDAR projections reflecting from the surface of the road (102) may reduce. Using the LIDAR projections pattern based on the forward movement, the upward gradient (104) may be determined. Likewise, FIG. 5C and FIG. 5D illustrates determination of downward gradient (103). The slope criticality may be determined using below equation:

$$S_c = \text{func(volume of LIDAR projections reflected at road surface)} = \text{projections}/10{,}000 \qquad (3)$$

Reference is now made to FIG. 6 illustrating determination of a curvature (105) of the road (102). In an embodiment, a boundary of the road (102) may be determined using existing techniques. Further, LIDAR rays may be projected on the road (102) to determine a curvature (105) of the road (102). The LIDAR projections reflecting from the surface of the road (102) may be processed to determine a central projection which may be parallel to an axis of the road (102). The autonomous vehicle (101) may be moved in intervals and the LIDAR projections may be monitored to identify if there is a deviation between the central beam and the axis of the road (102). When the deviation is determined, the angle of deviation is measured and the autonomous vehicle (101) may be steered in the direction of the axis of the road (102). The process is repeated until the curvature (105) is navigated. Then angle between the central beam and the axis of the road (102) may be ($A_i$). A curvature criticality may be determined using the below equation:

$$C_s = (A0 + A1 + \ldots + An)\%360 \qquad (4)$$

Referring back to FIG. 3, at step (303), produce the first velocity profile using the AI model and the second velocity profile using the hierarchical model, based on the one or more parameters. The velocity producing module (212) may be configured to produce the first and the second velocity profiles using the AI model and the hierarchical model. In an embodiment, the first and the second velocity profiles may be generated simultaneously.

Reference is now made to FIG. 7 illustrating generation of the first velocity profile. The AI model may comprise a plurality of input layers and one or more output layers. The AI model may further comprise one or more hidden layers. Each of the plurality of input layers may receive the one or more parameters as input and output one or more velocity values as output. The hidden layers may implement the activation functions to activate specific output layer(s) from the one or more output layers based on the training data set. In one implementation, when the input is a set of images from the imaging unit, a Convolution Neural Network (CNN) may be used as the AI model to determine the one or more parameters and a Fully Connected (FC) layer may be employed to determine the velocity values. For example, the CNN may be used to identify the one or more parameters and a Support Vector Machine (SVM) may be used to predict a suitable velocity value and a time duration for applying the velocity value. In one embodiment, a plurality of velocity groups may be defined such as "very low", "low" and "moderate" (represented as velocity group A, velocity group B and velocity group C respectively in FIG. 7). Each velocity group may have a range of velocity values and time duration. The SVM may be used to first identify a velocity group upon determining the one or more parameters, and then select a specific velocity value and the time duration from the range of velocity values and the time durations. In an embodiment, the AI model is trained during a training stage to produce the first velocity profile. In an embodiment, simulated road parameters may be provided as input to the AI model during the training stage. Simulated road parameters amounts to large training data set and the accuracy of the AI model may increase with the amount of the training data set. In another embodiment, the autonomous vehicle (101) may be navigated in test paths and the measurements from the one or more sensors (106) may be provided as input to the AI model. Further, an expert may supervise the output of the AI model and vary the weights and bias values of the AI model to increase the accuracy. In an embodiment, the AI model is trained to indicate the most relevant velocity profile from the plurality of velocity profiles. In an embodiment, training the AI model includes determining an association between the road information and the most relevant velocity profile among the plurality of velocity profiles for each of the plurality of training data set based on a human supervision. Further, the training includes verifying the AI model's accuracy upon classifying the association of the most relevant velocity profile with the input road information test data.

Reference is now made to FIG. 8A illustrating generation of the second velocity profile. The velocity producing module (212) may generate the second velocity profile using the hierarchical model. The hierarchical model is represented in the FIG. 8A. The hierarchical model may be a rule based model and may be used to improve the AI model. As the AI model is a trained model, the training data set may not cover all possible scenarios which affect the smooth movement of the autonomous vehicle (101). Hence, the hierarchical model may be used in parallel with the AI model to determine the second velocity profile simultaneously with the first velocity profile. In an embodiment, the one or more parameters may be grouped as slope and alignment parameters (gradient (104), curvature (105)) and surface deformation parameters (hump (103)). In an embodiment, each parameter of the surface deformation parameters may be arranged in hierarchy according to an impact of the parameter on the smooth movement of the autonomous vehicle (101). Further, an impact of each parameter from the slope and alignment parameters may be applied at specific level of hierarchy in the surface deformation parameters. For example, the hump (103) may be present in a road (102) with the a curvature (105) but not present in a road (102) with a gradient (104). Likewise, the potholes (402) may be present in a road (102) with the gradient (104), and a curvature (105). The potholes (402) may be placed at higher hierarchy compared to the hump (103) as the potholes (402) may have higher impact on the autonomous vehicle (101) compared to the hump (103). A combined impact (impact from the slope and alignment parameters and the surface deformation parameters) may be determined by the hierarchical model. A value of impact percentage of each parameter on the autonomous vehicle (101) may be denoted by (h, t, s and c) for the hump (103), roughness of the road (102), gradient (104) and the curvature (105) respectively. Further, the hierarchical model is used to determine a best value and a worst value for each of the one or more parameters. An exemplary illustration of determination of impact of each of the one or more parameters on the autonomous vehicle (101) is shown in FIG. 8B. As shown in FIG. 8B, an initial speed recommendation may be provided. For example, on a plane road (103), the speed recommended may be 50 km/hr. Further, upon encountering a hump on the plane road (103), the speed recommended may be 20 km/hr. Upon crossing the hump, the a recommendation may be provided to increase the speed back to 50 km/hr. Further, upon encountering a steep turn on the plane road (103) the speed recommended may be 30 km/hr. However, upon encountering a hump on a steep turn, the recommended speed may be due to an impact of the hump and the steep turn, of 5 km/hr. Likewise, different combinations of the slope and alignment parameters with the surface deformation parameters may be considered to determine an effective impact and the speed is recommended accordingly. The determination of impact of each parameter (h, t, s and c) is described with reference to FIG. 9 and FIG. 10.

Reference is now made to FIG. 9 showing a table illustrating best and worst values for the one or more parameters. The best and worst values of the one or more parameters may be defined by an expert during the creation of the hierarchical model or the best and worst values of the one or more parameters may be defined in a specification of the vehicle. For example, a hump having a higher height value and lower width value may have a worst impact on the autonomous vehicle (101) and a hump having lower height value and higher width value may have a best impact on the autonomous vehicle (101). Likewise, the worst and best impact value is calculated for each parameter (h, t, s and c).

As described above, the best and worst values of the one or more parameters may be defined by an expert during the creation of the hierarchical model or the best and worst values of the one or more parameters may be defined in a specification of the vehicle. The hierarchical model may be used to determine a relation between the impact values and a minimum speed value ($S_{min}$) and a maximum speed value ($S_{max}$) to navigate the different conditions (rough road condition, hump (103), gradient (104) and curvature (105). An example of a relation for navigating the hump (103) is provided below:

$$H_{c,best} * h * S_{fo} = S_{max-h} \quad (5)$$

$$H_{c,worst} * h * S_{fo} = S_{min-h} \quad (6)$$

Likewise, the relation between minimum speed and maximum speed for each of the one or more parameter and the corresponding impact values is calculated and is denoted in FIG. 10. Using equation 5 and 6, the impact value for the hump is calculated. Likewise, using equations similar to 5 and 6, the impact value for each of the one or more parameters is calculated. Further, based on the impact value of each of the one or more parameters a corresponding speed value (between the $S_{max}$ and $S_{min}$) may be determined. In an embodiment, the speed value for the one or more parameters may be represented as S(t), S(s), S(h) and S(c). Furthermore, an average speed value for each of the one or more parameter is along with the amount of time to apply the average speed value is determined as velocity value for the second velocity profile.

In an embodiment, the velocity recommendation module (213) may compare the first velocity profile and the second velocity profile. Comparing the first and the second velocity profile includes comparing the velocity values of the first and the second velocity profiles. The velocity profile having a lower velocity value may be selected as a relevant velocity profile. The lower velocity value is preferred in view of safety of the autonomous vehicle (101). Further, when the second velocity profile is selected, the selection along with the corresponding one or more parameters are provided as feedback to the AI model. The AI model may be updated (updating the model parameters) based on the feedback to improve/enhance the accuracy of the AI model. The selected velocity profile may be provided to the autonomous vehicle (101) to apply the velocity profile such that the autonomous vehicle (101) navigates the road condition smoothly.

In an embodiment, the one or more sensors (106) may measure the comfort of the passenger and may feedback to the ECU (107). The AI model may also be updated based on the comfort measurements from the one or more sensors (106). In an embodiment, a realistic velocity may be generated and applied to wheels of the autonomous vehicle (101) based on the selected velocity profile.

In an embodiment, the present disclosure produces velocity profiles to enable smooth navigation of the autonomous vehicle (101). The present disclosure discloses guiding the autonomous vehicle (101) by changing a maximum velocity limits in both angular and linear direction at runtime based on the road parameters. Hence, there is more flexibility to the autonomous vehicle (101) to plan the motion.

In an embodiment, by the virtue of the claim 1 of the present disclosure, the technical problem of rough driving and uncomfortable ride to passengers in the autonomous vehicle (101) is overcome.

The steps of receiving the road information from the one or more sensors (106), determining one or more road parameters related to smooth movement of the autonomous vehicle (101), determining the first and second velocity profile using the AI model and the hierarchical model and selecting one of the first and second velocity profile based on a comparison between them is not well-understood, or routine or conventional activity. The above steps comprise additional limitation that amounts to significantly more than the exceptions, i.e., the above steps solve a technical problem in the autonomous vehicle (101) in the solution is technologically advanced from the conventional art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating velocity profiles for an autonomous vehicle, the method comprising:
   receiving, by an Electronic Control Unit (ECU) of an autonomous vehicle, road information from one or more sensors associated with the autonomous vehicle when the autonomous vehicle is moving on a road;
   determining, by the ECU, one or more road parameters from the road information, related to smooth movement of the autonomous vehicle on the road; and
   producing, by the ECU, a first velocity profile using an Artificial Intelligence (AI) model and second velocity profile using a hierarchical impact model, based on the one or more parameters wherein each of the first velocity profile and the second velocity profile comprises at least a velocity value and a time duration for applying the velocity value, wherein, one of the first velocity profile and the second velocity profile is provided to the autonomous vehicle for navigating the road upon comparing the first velocity profile with the second velocity profile, wherein the AI model is trained using a plurality of training data sets comprising the road information, wherein the training comprises:
      determining an association between the road information and the most relevant velocity profile among the plurality of velocity profiles for each of the plurality of training data sets based on a human supervision; and
      verifying the AI model's accuracy on classifying the association of the most relevant velocity profile with the input road information test data.

2. The method of claim 1, wherein the road information comprises at least one of, a speed breaker, an inclination, a turn, a pothole, a road boundary, an obstacle, a traffic sign, a road sign, and a median.

3. The method of claim 1, wherein the AI model is trained to indicate the most relevant velocity profile from a plurality of velocity profiles using the one or more road parameters provided as input.

4. The method of claim 1, wherein producing the second velocity profile using the hierarchical impact model comprises:
   determining an impact value of each of the one or more road parameters based on a maximum velocity value and a minimum velocity for each of the one or more road parameters; and
   determining an average velocity value based on the determined impact value for each of the one or more road parameters.

5. The method of claim 1, wherein comparing comprises selecting a lesser velocity value among the first velocity profile and the second velocity profile when a difference is above a threshold value.

6. The method of claim 5, wherein the one or more road parameters and the selected velocity profile from the first velocity profile are fed back to enhance the AI model upon the difference between the first velocity profile and the second velocity profile is above the threshold value, wherein the AI model updates one or more model parameters based on the feedback.

7. The non-transitory computer readable medium of claim 1, wherein the AI model is trained to indicate the most relevant velocity profile from a plurality of velocity profiles using the one or more road parameters provided as input.

8. An Electronic Control Unit ECU for generating velocity profiles for an autonomous vehicle, the ECU comprising:
   a processor; and
   a memory, communicatively communicated with the processor, storing processor executable instructions, which, on execution causes the processor to:
   receive road information from one or more sensors associated with the autonomous vehicle when the autonomous vehicle is moving on a road;
   determine one or more road parameters from the road information, related to smooth movement of the autonomous vehicle on the road; and
   produce a first velocity profile using an Artificial Intelligence (AI) model and second velocity profile using a hierarchical impact model, wherein each of the first velocity profile and the second velocity profile comprises at least a velocity value and a time duration for applying the velocity value, wherein, one of the first velocity profile and the second velocity profile is provided to the autonomous vehicle for navigating the road upon comparing the first velocity profile with the second velocity profile, wherein the processor trains the AI model using a plurality of training data sets comprising the road information, wherein the processor is configured to:
      determine an association between the road information and the most relevant velocity profile among the plurality of velocity profiles for each of the plurality of training data sets based on a human supervision; and
      verify the AI model's accuracy on classifying the association of the most relevant velocity profile with the input road information test data.

9. The ECU of claim 8, wherein the processor trains the AI model to indicate the most relevant velocity profile from a plurality of velocity profiles using the one or more road parameters provided as input.

10. The ECU of claim 8, wherein the processor produces the second velocity profile using the hierarchical impact mode, wherein the processor:
   determines an impact value of each of the one or more road parameters based on a maximum velocity value and a minimum velocity for each of the one or more road parameters; and
   determines an average velocity value based on the determined impact value for each of the one or more road parameters.

11. The ECU of claim 8, wherein the processor compares by selecting a lesser velocity value among the first velocity profile and the second velocity profile when a difference is above a threshold value.

12. The ECU of claim 11, wherein the processor feedback the one or more road parameters and the selected velocity profile from the first velocity profile to enhance the AI model upon the difference between the first velocity profile and the second velocity profile is above the threshold value, wherein the AI model updates one or more model parameters based on the feedback.

13. A non-transitory computer readable medium including instructions stored thereon that when processed by at least one processor cause a device to perform operations comprising:
   receiving road information from one or more sensors associated with the autonomous vehicle when the autonomous vehicle is moving on a road;
   determining one or more road parameters from the road information, related to smooth movement of the autonomous vehicle on the road; and
   producing a first velocity profile using an Artificial Intelligence (AI) model and second velocity profile using a hierarchical impact model, based on the one or more parameters wherein each of the first velocity profile and the second velocity profile comprises at least a velocity value and a time duration for applying the velocity value, wherein, one of the first velocity profile and the second velocity profile is provided to the autonomous vehicle for navigating the road upon comparing the first velocity profile with the second velocity profile, wherein the AI model is trained using a plurality of training data sets comprising the road information, wherein the training comprises:
   determining an association between the road information and the most relevant velocity profile among the plurality of velocity profiles for each of the plurality of training data sets based on a human supervision; and
   verifying the AI model's accuracy on classifying the association of the most relevant velocity profile with the input road information test data.

14. The non-transitory computer readable medium of claim 13, wherein the road information comprises at least one of, a speed breaker, an inclination, a turn, a pothole, a road boundary, an obstacle, a traffic sign, a road sign, and a median.

15. The non-transitory computer readable medium of claim 13, wherein producing the second velocity profile using the hierarchical impact model comprises:
   determining an impact value of each of the one or more road parameters based on a maximum velocity value and a minimum velocity for each of the one or more road parameters; and
   determining an average velocity value based on the determined impact value for each of the one or more road parameters.

16. The non-transitory computer readable medium of claim 13, wherein comparing comprises selecting a lesser velocity value among the first velocity profile and the second velocity profile when a difference is above a threshold value, wherein the one or more road parameters and the selected velocity profile from the first velocity profile are fed back to enhance the AI model upon the difference between the first velocity profile and the second velocity profile is above the threshold value, wherein the AI model updates one or more model parameters based on the feedback.

* * * * *